INVENTOR
Harold Sinclair
BY
Benjamin Sweedler
ATTORNEY

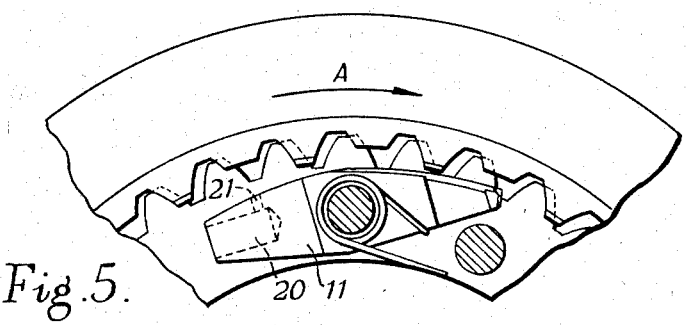
Fig. 5.
Fig. 6. Fig. 7. Fig. 10.
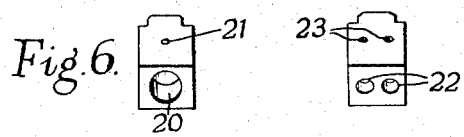
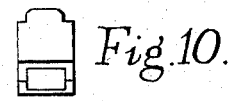
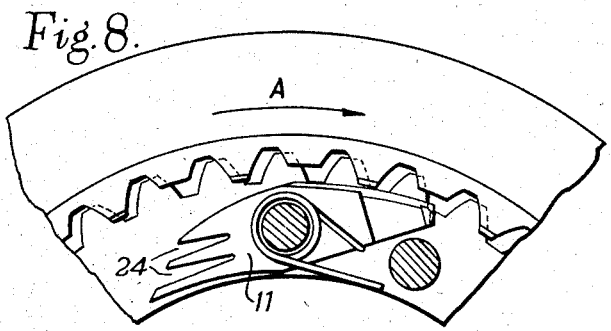
Fig. 8.
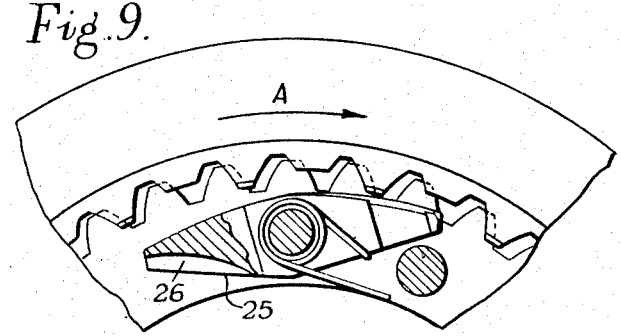
Fig. 9.

United States Patent Office 2,907,431
Patented Oct. 6, 1959

2,907,431

PAWL AND RATCHET MECHANISMS

Harold Sinclair, Windsor, England

Application September 2, 1955, Serial No. 532,301

Claims priority, application Great Britain September 7, 1954

8 Claims. (Cl. 192—67)

This invention relates to the control of a pawl and ratchet mechanism in apparatus wherein the pawl and ratchet mechanism is or may be required to operate for a time in the free-wheeling condition with the pawl (or pawls) ratcheting past the ratchet teeth. The invention relates particularly but not exclusively to the control of pawl and ratchet mechanisms incorporated in synchro couplings of the Legge type os described in British patent specifications Nos. 354,711 and 410,083, or in clutches of the synchro-self-shifting type, examples of which are described in British patent specification No. 513,974.

Ratcheting for lengthy periods of time and/or at high relative speeds as between the pawl and the ratchet teeth is undesirable since it leads to wear of the pawl, and spring, and its support pin or the like, and of the co-acting surfaces of the ratchet teeth, and it is an object of the invention to provide for the control of the pawl whereby such ratcheting especially at high speeds can be avoided.

According to the invention use is made of controlled fluid pressure acting directly or indirectly on the pawl (or pawls) whereby to withdraw the nose of the pawl from ratcheting engagement with the ratchet teeth. According to the invention in another form use is made of controlled fluid pressure acting directly or indirectly on the pawl (or pawls) to bring the nose into ratcheting engagement with the ratchet teeth.

In one form of the invention use is made of the kinetic energy pressure of a suitable fluid, for example oil directed against a suitable part of the pawl or against a pawl actuating member. The fluid may for example, be directed in an appropriate direction to act on the tail of the pawl, or it may be directed in the converse direction to act on the nose of the pawl.

In a preferred form of the invention, where the pawl-carrying member of the ratchet mechanism rotates during free-wheeling of the ratchet mechanism, use may be made of the effective pressure due to centrifugal action of liquid, for example oil applied to an appropriate part of the pawl or of a pawl actuating member, to control engagement of the pawl.

In the employment of any of the above-mentioned forms of the invention wherein the fluid is a liquid the pawl or the pawl actuating member may be provided with vanes or be suitably shaped to provide pockets, chambers channels or surfaces, such that the action of the liquid directly or indirectly on the pawl is enhanced whilst the said liquid is not retained in substantial quantity permanently on the pawl or on the actuating mechanism.

The supply of fluid to the pawl may be arranged to be controlled externally by an operator, or by a governor responsive to speed or the supply may be arranged to be controlled in accordance with the angular speed of the pawl and/or ratchet, or in accordance with the difference between the angular speeds of the pawl or ratchet, whereby the supply of fluid to actuate the pawl is automatically increased when it is required to control the pawl, e.g. to free the nose of the pawl from ratcheting engagement, and the supply is reduced automatically when such control is required in the converse sense e.g. when ratcheting engagement is required in preparation for the transmission of torque. In appropriate cases such automatic action may, as will be described, be obtained directly in accordance with angular relative movement between the part carrying the pawl and the part carrying the ratchet teeth.

In order that the invention may be clearly understood and readily carried into effect, some embodiments thereof will now be described by way of example with reference to the accompanying drawings, in which:

Figs. 5 to 10 illustrate other forms of pawls which may be employed alternatively to those illustrated in Figs. 1 to 4.

Figure 1:
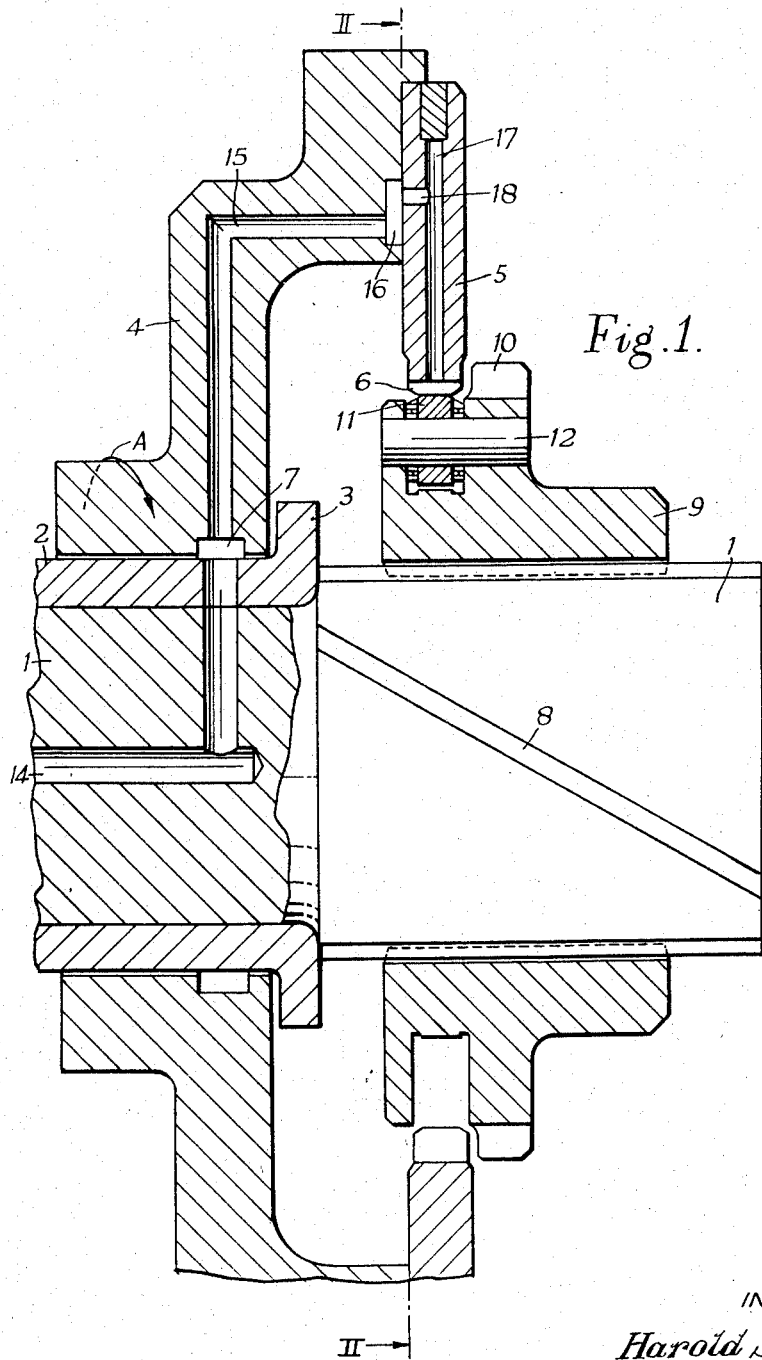
Fig. 1 is a view in longitudinal section of part of one form of a synchronous self-shifting (S.S.S.) clutch incorporating pawl and ratchet mechanism according to the invention.

Referring to Figs. 1 to 4, the S.S.S. clutch illustrated comprises a shaft 1 on which is fixed a sleeve 2 the end of which is formed with radial outwardly projecting flange 3. Coaxial with and separate from the sleeve 2 is mounted a member 4 to which is bolted or otherwise fixed a ring 5 formed with internal jaw clutch teeth 6.

The shaft 1 is formed with helical splines indicated at 8, and mounted thereon is an intermediate member 9 formed with internal helical splines which are engaged with the splines 8 whereby the intermediate member is constrained for helical movement with respect to the axis of the shaft 1. The intermediate member 9 is formed with a ring of external jaw clutch teeth 10, and carries four pawls 11 mounted on pivot pins 12 and provided with springs 13 which urge the noses of the pawls 11 radially outwards with respect to the axis of the clutch.

Figure 2:
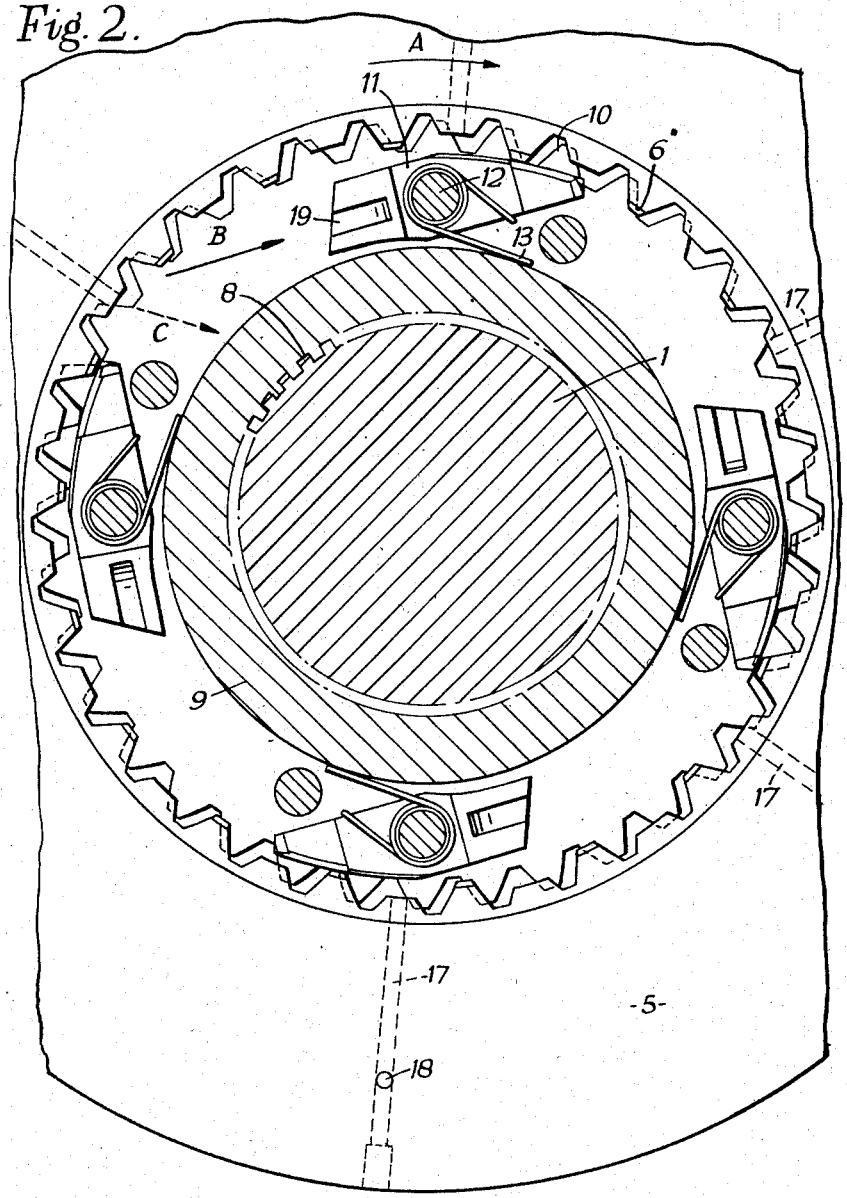
Fig. 2 is a sectional view on the line 11—11 of Fig. 1.

The operation of the clutch as so far described is as follows:

Assuming that the parts are in the positions shown in Figs. 1 and 2, if the member 4 is rotating in the direction of arrow A (Figs. 1 and 2) relatively to the shaft 1, the internal teeth 6 ratchet past the noses of the pawls 11. If the direction of relative rotation of the shaft 1 and member 4 tends to reverse, e.g., due to shaft 1 tending to rotate faster than member 4 in the direction of the arrow A, one of the pawls 11 is picked up by a tooth 6 and the intermediate member 9 is shifted along the shaft 1, to bring the external jaw clutch teeth 10 into engagement with the internal jaw clutch teeth 6.

The movement of the intermediate member to the left (Fig. 1) is limited by the axial stop formed by the flange 3 on the sleeve 2. So long as the shaft 1 tends to rotate in the direction of arrow A faster than member 4 torque is transmitted from shaft 1 to member 4 via the jaw clutch teeth 10 and 6. If the shaft 1 rotates in the direction of arrow A relatively slower than member 4, the intermediate member 9 shifts along the shaft 1 (to the right in Fig. 1), so as to bring the teeth 10 out of engagement with the teeth 6 and to bring the pawls 11 into ratcheting engagement with the teeth 6 as in Figs. 1 and 2. The clutch, as so far described, thus operates as a unidirectional free-wheel, the pawls 11 ratcheting in the free-wheeling condition of the clutch.

In order to carry the present invention into effect, the shaft 1 is formed with an axial duct 14 which communicates via an annular groove 7 with a duct 15 in the member 4, the duct 15 communicating with the annular groove 16 in the face of member 4 to which the ring 5 is fixed.

Figure 3:
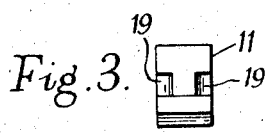
Fig. 3 is a view in elevation of the tail of one of the pawls of the mechanism of Fig. 1.
Figure 4:
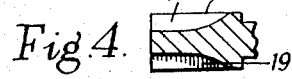
Fig. 4 is a sectional plan view of the tail of the pawl.

The ring 5 is formed with radial ducts 17 which communicate via ports 18 with the groove 16 and which are open at their inner ends. The pawls 11 each of which is balanced about the axis of its pivot pin 12, have grooves 19 formed in their sides, as shown in Figs. 2, 3 and 4. Oil is fed under pressure to the duct 14 in any suitable manner. It has not been thought necessary to show the oil-feeding arrangements since it is a well known expedient to supply oil to ducts in shafts, for example for the purpose of lubricating bearings. The oil fed to duct 14 passes via annular groove 7 and duct 15, annular groove 16 and ports 18, to the radial ducts 17 and emerges from ring 4 in the form of jets which may be directed radially inward as shown in Fig. 2, with respect to the axis of the clutch.

At times when the member 4 is over-running the shaft 1, i.e., the clutch is free-wheeling, the oil jets have a velocity component in the direction of arrow B (Fig. 2) which is greater or lesser according to whether the relative speed of member 4 in relation to shaft 1 is higher or lower, whereby when the speed of member 4 in relation to shaft 1 is higher, oil is fed into the grooves 19 in the sides of the pawls 11, thereby loading the tails of the pawls. At low relative speeds of the shaft 1 and member 4, the rate of oil supply to the grooves 19 is low since the direction of relative oil flow is not suitable for filling the grooved chambers 19 in the tails of the pawls being for example as indicated by arrow C (Fig. 2), and the leakage of oil from the ends of the grooves nearest the pawl pivot pins 12 prevents the oil from accumulating in the grooves 19 to an extent sufficient to load the tails of the pawls appreciably. When the relative speed of shaft 1 with respect to member 4 increases, the rate at which oil is fed to the grooves 19 overtakes the rate at which oil flows out of grooves 19, until the centrifugal weight of the oil acting on the tails of the pawls is sufficient to overcome the forces due to friction on the pivot pins 12 and the action of the springs 13, and to bring the noses of the pawls out of ratcheting engagement with the teeth 6. With the relative speed of the shaft 1 with respect to member 4 decreases, the centrifugal weight of the oil acting on the tails of the pawls decreases until a point is reached at which the noses of the pawls are again permitted to resume ratcheting engagement with the teeth 6.

Means may if desired be provided whereby during prolonged periods of driving engagement or low relative speeds of the shaft 1 and member 4, the oil supply to duct 14 may be cut off.

In the clutch mechanism shown in Figs. 5 and 6, the tail of each pawl 11 is formed with a cavity 20 for the accumulation of oil, and a leak-off port 21 of small diameter permits oil to flow from the cavity 20. The operation is similar to that of the clutch shown in Figs. 1 to 4.

The single cavity 20 of Figs. 5 and 6 may, if desired, be replaced by two (or more) cavities, as shown at 22 in Fig. 7 provided with individual leak-off ports 23.

In the arrangement shown in Fig. 8, the tail of each pawl 11 is formed with a plurality of slots 24 for the reception and accumulation of oil, which can leak slowly from the sides of the slots.

In the arrangement shown in Figs. 9 and 10, the radially inner side of the tail of the pawl is formed with a recess 25 having a concave surface 26. In this case oil impinges on the underside of the tail at a speed, and, therefore, a pressure which varies in accordance with the speed of shaft 1 relatively to the member 4, and this oil pressure on the tail of the pawl has a component which is directed radially away from the clutch axis. Thus, as the speed of member 4 relatively to the shaft 1 increases, a point is reached at which the oil pressure on the tail of the pawl is sufficient to bring the nose of the pawl out of ratcheting engagement.

If desired similar techniques may be employed for applying oil to the nose of the pawl instead of to the tail thereof, in order to move the nose into ratcheting engagement when required against the return action of a spring or of centrifugal force.

Further if desired means may be provided for selectively applying oil to the nose and tail of the pawl to bring the nose into and out of ratcheting engagement as required.

I claim:

1. Pawl and ratchet mechanism comprising a first member, a ring of ratchet teeth on said first member, a second member mounted coaxially with said first member and rotatable in one direction relatively to said first member, at least one pawl with a nose portion and a tail portion, carried by said second member, a control spring for said pawl and means for feeding a jet of liquid to act on said pawl in opposition to said control spring.

2. Pawl and ratchet mechanism according to claim 1 wherein said first member has therein at least one duct connectible to a source of liquid under pressure and adapted to deliver a jet of liquid that is encountered by said pawl during relative rotation of said first member with respect to said second member.

3. A synchronous self-shifting clutch comprising a first rotary clutch member provided with jaw clutch teeth, a second rotary clutch member coaxial with said first member, and an intermediate member provided with jaw clutch teeth and constrained for helical movement relative to said second clutch member to bring its jaw clutch teeth into and out of engagement with the jaw clutch teeth of said first clutch member, a ratchet mechanism for effecting engagement of the clutch teeth of said first and intermediate members when said first and second clutch members tend to move angularly relatively to one another in one sense, said ratchet mechanism comprising at least one pawl carried by one of said first and intermediate members and adapted to cooperate with projections on the other of said first and intermediate members, the said other of said first and intermediate members having said projections thereon having therein at least one duct for delivering a jet of liquid to said pawl to control the ratcheting engagement of said pawl with said projections.

4. A synchronous self-shifting clutch according to claim 3 including a control spring for said pawl, said pawl having means therein for accumulating liquid at a part of said pawl at which the centrifugal weight of the accumulated liquid during rotation of the pawl carrying part of the clutch opposes the action of said control spring.

5. A synchronous self-shifting clutch according to claim 3 wherein said first member has a ring of internal projections and said pawl is carried by said intermediate member, and wherein said duct delivers a stream of liquid in a direction substantially radially inward with respect to the clutch axis, and said pawl has the tail portion thereof provided with a cutaway portion to accumulate liquid during the angular movement of said pawl with respect to said stream.

6. A synchronous self-shifting clutch comprising a first rotary clutch member provided with jaw clutch teeth, a second rotary clutch member coaxial with said first member, and an intermediate member provided with jaw clutch teeth and constrained for helical movement relative to said second clutch member to bring its jaw clutch teeth into and out of engagement with the jaw clutch teeth of said first clutch member, a ratchet mechanism for effecting engagement of the clutch teeth of said first and intermediate members when said first and second clutch members tend to move angularly relatively to one another in one sense, said ratchet mechanism comprising at least one pawl carried by one of said first and intermediate members and adapted to cooperate with projections on the other of said first and intermediate members, that one of said clutch members that has said projections having at least one liquid supply duct opening towards said intermediate member in a substantially radial direction whereby relative movement of the member having the duct relative to said intermediate member in the ratcheting sense imparts to liquid issuing from said duct a velocity component directed towards the tail portion of said pawl, said component increasing with increase in said relative movement.

7. A synchronous self-shifting clutch according to claim 6, the tail portion of the pawl having therein at least one recess for the accumulation therein of liquid directed towards it by virtue of said velocity component, whereby to increase the centrifugal weight of said tail portion as said relative movement increases.

8. A synchronous self-shifting clutch according to claim 6 wherein the tail portion of the pawl is formed with a pressure surface for the impingement thereon of liquid directed towards it by virtue of said velocity component, the pressure of liquid on said surface increasing with increase in said relative motion and consequent increase in the kinetic energy of liquid impinging on said surface.

References Cited in the file of this patent
UNITED STATES PATENTS

| | | |
|---|---|---|
| 2,086,967 | Sontach | July 13, 1937 |
| 2,224,322 | Sinclair | Dec. 10, 1940 |
| 2,323,353 | Plog | July 6, 1943 |